US011193005B2

(12) United States Patent
Behabtu

(10) Patent No.: US 11,193,005 B2
(45) Date of Patent: Dec. 7, 2021

(54) CELLULOSE/POLYSACCHARIDE COMPOSITES

(71) Applicant: NUTRITION & BIOSCIENCES USA 4, INC., Rochester, NY (US)

(72) Inventor: Natnael Behabtu, Wilmington, DE (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 0 days.

(21) Appl. No.: 16/461,293

(22) PCT Filed: Nov. 14, 2017

(86) PCT No.: PCT/US2017/061466
§ 371 (c)(1),
(2) Date: May 15, 2019

(87) PCT Pub. No.: WO2018/093748
PCT Pub. Date: May 24, 2018

(65) Prior Publication Data
US 2020/0062929 A1 Feb. 27, 2020

Related U.S. Application Data

(60) Provisional application No. 62/422,629, filed on Nov. 16, 2016.

(51) Int. Cl.
| | | |
|---|---|---|
| *C08L 1/02* | (2006.01) | |
| *D21H 17/53* | (2006.01) | |
| *D21H 17/25* | (2006.01) | |
| *D21H 23/04* | (2006.01) | |
| *C08L 5/00* | (2006.01) | |

(52) U.S. Cl.
CPC ............... *C08L 1/02* (2013.01); *C08L 5/00* (2013.01); *D21H 17/25* (2013.01); *D21H 17/53* (2013.01); *D21H 23/04* (2013.01)

(58) Field of Classification Search
None
See application file for complete search history.

(56) References Cited

U.S. PATENT DOCUMENTS

| | | | | |
|---|---|---|---|---|
| 5,308,663 A | * | 5/1994 | Nakagawa ............ | D06M 15/03 162/157.7 |
| 5,702,942 A | | 12/1997 | Leathers et al. | |
| 6,709,709 B1 | * | 3/2004 | Ozawa ................ | D06M 13/005 427/389.9 |
| 7,000,000 B1 | * | 2/2006 | O'Brien .................. | C12P 19/08 536/123.12 |
| 8,642,757 B2 | * | 2/2014 | O'Brien ............... | C12N 9/1051 536/126 |
| 9,080,195 B2 | | 7/2015 | O'Brien et al. | |
| 9,139,718 B2 | | 9/2015 | Paullin et al. | |
| 9,644,322 B2 | | 5/2017 | Massouda | |
| 2006/0127328 A1 | | 6/2006 | Monsan et al. | |
| 2009/0211720 A1 | * | 8/2009 | Myllymaki .............. | C08J 3/096 162/176 |
| 2013/0244287 A1 | | 9/2013 | O'Brien et al. | |
| 2013/0244288 A1 | | 9/2013 | O'Brien et al. | |
| 2014/0179913 A1 | | 6/2014 | Paullin et al. | |
| 2015/0064748 A1 | * | 3/2015 | Caimi ..................... | C12P 19/18 435/97 |
| 2015/0191550 A1 | * | 7/2015 | Mishra ...................... | C08L 5/00 536/123.12 |
| 2015/0232785 A1 | * | 8/2015 | Paullin ................. | C11D 3/0036 510/299 |
| 2016/0096931 A1 | * | 4/2016 | Tran ......................... | C08L 1/00 514/54 |
| 2016/0230348 A1 | | 8/2016 | Massouda | |
| 2017/0362345 A1 | | 12/2017 | Behabtu et al. | |

FOREIGN PATENT DOCUMENTS

| | | |
|---|---|---|
| WO | 2014077854 A1 | 5/2014 |
| WO | 2015200589 A1 | 12/2015 |
| WO | 2016106011 A1 | 6/2016 |
| WO | 2016126685 A1 | 8/2016 |
| WO | 2016196022 A1 | 12/2016 |
| WO | 2017003808 A1 | 1/2017 |

OTHER PUBLICATIONS

Definition of colloid, The American Heritage Dictionary of the English Language, 5th Ed., 2016, [online], retrieved from the Internet, [retrieved Aug. 28, 2020], <URL: https://www.yourdictionary.com/colloid>. (Year: 2016).*
Kolpak, Macromolecules, vol. 9, pp. 273-278.
Kroon-Batenburg, Glycoconjugate J., vol. 14, pp. 677-690.
International Preliminary Report on Patentability for PCT/US17/61466 dated May 21, 2019.

* cited by examiner

*Primary Examiner* — Dennis R Cordray

(57) ABSTRACT

Disclosed herein are cellulose/polysaccharide composites comprising a) cellulose; and b) an enzymatically-produced polysaccharide, certain derivatives of an enzymatically-produced polysaccharide, or a mixture thereof; wherein the enzymatically-produced polysaccharide and the polysaccharide derivative are water-insoluble. The cellulose is plant-derived. The composites are useful in forming articles such as paper, packaging material, or insulating material.

24 Claims, No Drawings

CELLULOSE/POLYSACCHARIDE COMPOSITES

CROSS-REFERENCE TO RELATED APPLICATIONS

This application is the National Stage application of International Application No. PCT/US2017/61466 (filed Nov. 14, 2017), which claims priority to U.S. Provisional Application No. 62/422,629 (filed Nov. 16, 2016), the disclosures of which prior applications are incorporated herein by reference in their entirety.

FIELD OF THE DISCLOSURE

The present disclosure is directed towards cellulose/polysaccharide composites comprising cellulose and a polysaccharide. The composites can be used in articles such as paper, packaging material, or insulating material.

BACKGROUND

Cellulose-based paper is used extensively in the flexible and rigid packaging space. In some applications, the properties of cellulose-based paper can be enhanced by using technologies that are able to expand the performance of cellulose-based products to provide, for example, higher barrier properties, higher density/stiffer structures, and/or higher tensile strength. If the performance enhancement can be achieved while maintaining the renewably-based nature and biodegradability of cellulose, this can result in a win-win for society at large.

Cellulose pulp is often blended with fillers such as calcium carbonate, kaolin, titanium dioxide, and nanocellulose during the paper making process, and such fillers can also be present in formulations used to coat cellulose-based paper. A drawback with the use of large amounts of calcium carbonate is that with increasing amounts, the mechanical strength of the paper decreases and the recyclability of highly filled paper also decreases. Water-soluble cationic starch and cationic polyvinyl alcohol (PVOH) are also used as strength enhancing ingredients. Typically, when fillers are used in the wet-end part of paper making, they can reduce the overall performance properties of the paper. Water-soluble cationic polymers tend to saturate their performance enhancement at very low loading; typically, additional amounts beyond about 1% of water-soluble cationic polymer provide no further enhancement of paper strength. Also, paper is highly porous. For many packaging applications where barrier properties are important, paper needs to be coated with a continuous film in order to achieve the desired barrier properties. Often the coatings comprise petroleum-based thermoplastic polymers, which adds a non-renewable component to the coated paper. The synthetic polymer coating often disrupts the ability of the packaging to fully biodegrade and the cellulose pulp to be recycled. Highly-fibrillated cellulose and nanocellulose can also be used to make low porosity papers. However, the use of highly fibrillated cellulose and nanocellulose has a significant downside as it slows water drainage during the paper making or molding process to a point that process throughput is significantly reduced, which can have significant negative impact on process economics.

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. One such polysaccharide is poly alpha-1,3-glucan, a glucan polymer characterized by having alpha-1,3-glycosidic linkages. U.S. Pat. No. 9,644,322 discloses a solid article formed from poly alpha-1,3-glucan and wood pulp, and methods for making the solid article. Published patent application WO 2016/196022 discloses poly alpha-1,3-glucan fibrids and uses for the fibrids, including papermaking.

There is a growing need for a renewable filler for paper that can help to increase paper strength with increasing amounts of filler, and also retain good recyclability with the increased amounts of filler. There also exists a need for renewable materials which can be used to make paper while providing improved properties, such as barrier properties.

SUMMARY

Disclosed herein are cellulose/polysaccharide composites comprising:

a) cellulose; and b) an enzymatically-produced polysaccharide, a derivative of an enzymatically-produced polysaccharide, or a mixture thereof;

wherein the enzymatically-produced polysaccharide and the polysaccharide derivative are water-insoluble.

In one embodiment, the enzymatically-produced polysaccharide comprises:

i) poly alpha-1,3-glucan;

ii) poly alpha-1,3-1,6-glucan;

iii) alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or iv) water-insoluble cellulose having a weight-average degree of polymerization ($DP_w$) of about 10 to about 1000 and a cellulose II crystal structure.

In another embodiment, the polysaccharide derivative comprises:

v) a composition comprising a poly alpha-1,3-glucan ester compound represented by Structure I:

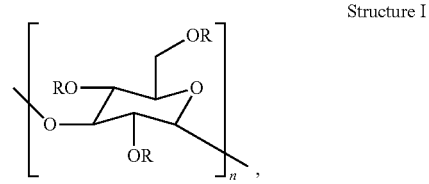

Structure I wherein (A) n is at least 6;

(B) each R is independently an —H or a first group comprising —CO—$C_x$—COOH, wherein the —$C_x$— portion of said first group comprises a chain of 2 to 6 carbon atoms; and (C) the compound has a degree of substitution with the first group of about 0.001 to about 0.2.

In a further embodiment, the polysaccharide derivative comprises vi) a composition comprising a poly alpha-1,3-glucan ether compound represented by Structure III:

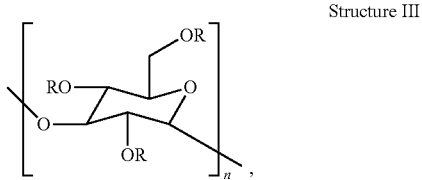

Structure III wherein
(D) n is at least 6,
(E) each R is independently an H or an organic group, and
(F) the ether compound has a degree of substitution (DoS) of about 0.001 to about 0.2.

In another embodiment, the polysaccharide or polysaccharide derivative comprises particles having an average particle size in at least one dimension in the range of from about 20 nm to about 200 μm. In another embodiment, the polysaccharide or polysaccharide derivative is characterized by a surface area in the range of from about 0.1 $m^2/g$ to about 200 $m^2/g$, as determined by Brunauer-Emmett-Teller measurement method.

In one embodiment, the polysaccharide comprises poly alpha-1,3-glucan. In another embodiment, the polysaccharide comprises poly alpha-1,3-1,6-glucan. In an additional embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In some embodiments, the composite further comprises inorganic particles selected from titanium dioxide, calcium carbonate, mica, vermiculite, silica, kaolin, talc, or a mixture thereof. In some embodiments, the composite further comprises cationic starch, latex, a flocculating agent, or a retention agent. In one embodiment, the composite comprises from about 1 weight percent to about 99 weight percent polysaccharide, based on the total weight of the composite.

Also disclosed is an article comprising the cellulose/polysaccharide composite. In one embodiment, the article is paper, packaging material, insulating material, a paper cup, a paper plate, an egg carton, or molded cellulose packaging material.

Also disclosed herein is a process for making a cellulose/polysaccharide composite, the process comprising the steps of:

a) dispersing cellulose pulp and an enzymatically-produced polysaccharide, a derivative of an enzymatically-produced polysaccharide, or a mixture thereof, in an aqueous medium to form a slurry;

b) forming a cellulose/polysaccharide composite by filtering off the aqueous medium to form a wet composite; and c) drying the wet composite to obtain a dry composite.

In one embodiment, the process further comprises a step d) treating the wet composite obtained in step b) or the dry composite obtained in step c) with an aqueous NaOH or KOH solution.

In one embodiment of the process, the polysaccharide is in the form of fibrids. In another embodiment, the polysaccharide is in the form of a colloidal dispersion. In yet another embodiment, the polysaccharide is in the form of a wet cake.

In another embodiment of the process, the polysaccharide comprises particles having an average particle size in at least one dimension in the range of from about 20 nm to about 200 μm (200,000 nm). In one embodiment, the polysaccharide comprises a polysaccharide characterized by a surface area in the range of from about 0.1 $m^2/g$ to about 200 $m^2/g$, as determined by Brunauer-Emmett-Teller measurement method. In another embodiment, the polysaccharide comprises poly alpha-1,3-1,6-glucan. In another embodiment, the polysaccharide comprises poly alpha-1,3-1,6-glucan. In an additional embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000. In yet another embodiment, the polysaccharide comprises a composition comprising a poly alpha-1,3-glucan ester compound represented by Structure I:

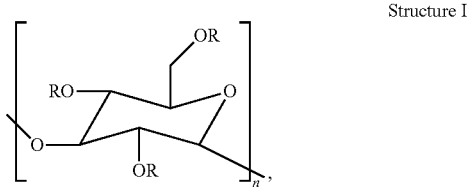

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 0.2.

In a further embodiment, the polysaccharide comprises a composition comprising a poly alpha-1,3-glucan ether compound represented by Structure III:

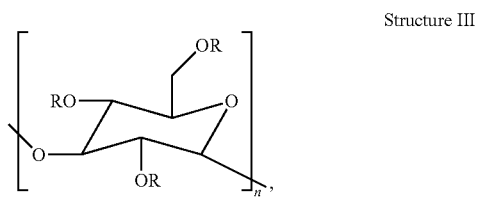

Structure III wherein
(D) n is at least 6,
(E) each R is independently an H or an organic group, and
(F) the ether compound has a degree of substitution (DoS) of about 0.001 to about 0.2.

DETAILED DESCRIPTION

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "polysaccharide" means a polymeric carbohydrate molecule composed of long chains of monosaccharide units bound together by glycosidic linkages and on hydrolysis give the constituent monosaccharides or oligosaccharides.

The term "latex" means a dispersion of polymer particles or a polymer emulsion in water.

The term "cationic starch" refers to starch containing a positively charged portion formed by quaternary ammonium cations. Cationic starch is a wet strength additive used in papermaking.

The term "retention agent" refers to additives used in the papermaking industry which are added to improve retention of fine particles and fillers during the formation of paper. Typical examples of retention agents include polyacrylamine, polyethyleneimine, colloidal silica, and bentonite.

The term "flocculating agent" refers to chemical additives that cause suspended solids to form aggregates.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

An "aqueous composition" herein refers to a solution or mixture in which the solvent is at least about 20 wt % water, for example, and which comprises poly alpha-1,3-1,6-glucan. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of, for example, poly alpha-1,3-1,6-glucan or poly alpha-1,3-glucan in water or aqueous solution.

As used herein, the term "colloidal dispersion" refers to a heterogeneous system having a dispersed phase and a dispersion medium, i.e., microscopically dispersed insoluble particles are suspended throughout another substance. An example of a colloidal dispersion in water is a hydrocolloid. The colloidal dispersion may be a stable colloidal dispersion or an unstable colloidal dispersion. The stable colloidal dispersion is stable at room temperature and/or at elevated temperature, for example, between 40 and 50° C. for a period of at least one month with no visible settling. The unstable dispersion, under the same conditions, may see at least a portion of the poly alpha-1,3-glucan and/or poly alpha-1,3-1,6-glucan settle out of the dispersion. Agitation of the settled material will generally re-form the colloidal dispersion. In some embodiments, the colloidal dispersion is a stable dispersion. In other embodiments, the colloidal dispersion is an unstable dispersion.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by techniques such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The term "composite", as used herein, refers to a material made from two or more constituent materials (i.e. plant-based cellulose and an enzymatically-produced polysaccharide) with significantly different physical or chemical properties that, when combined, produce a material with characteristics different from the individual components. The individual components remain separate and distinct within the finished structure.

The present disclosure is directed to cellulose/polysaccharide composites comprising or consisting essentially of:
  a) cellulose; and
  b) an enzymatically-produced polysaccharide, a derivative of an enzymatically-produced polysaccharide, or a mixture thereof;
wherein the enzymatically-produced polysaccharide and the polysaccharide derivative are water-insoluble. The cellulose is plant-derived. The composites are useful in articles such as paper, packaging material, or insulating material.

Various polysaccharides are useful in the cellulose/polysaccharide composites disclosed herein. In one embodiment, the enzymatically-produced polysaccharide comprises:
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
  iv) water-insoluble cellulose having a weight-average degree of polymerization ($DP_w$) of about 10 to about 1000 and a cellulose II crystal structure. Mixtures of these polysaccharides can also be used.

In another embodiment, the derivative of an enzymatically-produced polysaccharide comprises:
  v) a composition comprising a poly alpha-1,3-glucan ester compound represented by Structure I:

Structure I

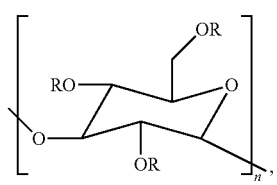

wherein
  (A) n is at least 6;
  (B) each R is independently an —H or a first group comprising —CO—C$_x$—COOH, wherein the —C$_x$— portion of said first group comprises a chain of 2 to 6 carbon atoms; and
  (C) the compound has a degree of substitution with the first group of about 0.001 to about 0.2; or
  vi) a composition comprising a poly alpha-1,3-glucan ether compound represented by Structure III:

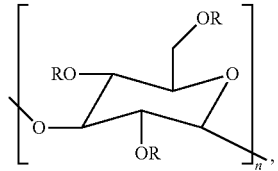

wherein
  (D) n is at least 6,
  (E) each R is independently an H or an organic group, and
  (F) the ether compound has a degree of substitution (DoS) of about 0.001 to about 0.2.

Mixtures of an enzymatically-produced polysaccharide and a derivative of an enzymatically-produced polysaccharide can also be used.

In one embodiment, the polysaccharide or polysaccharide derivative comprises particles having an average particle size in at least one dimension in the range of from about 20 nm to about 200 μm (200,000 nm). In another embodiment, the polysaccharide or polysaccharide derivative comprises particles having an average particle size in at least one dimension in the range of from about 5 nm to about 200 μm (200,000 nm). For example, the average particle size in at least one dimension can be 5, 10, 15, 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000; 80,000; 90,000; 100,000; 125,000; 150,000; 175,000; or 200,000 (or any value between 5 and 200,000) nm. In a further embodiment, the polysaccharide or polysaccharide derivative comprises particles having an average particle size in at least one dimension in the range of from about 20 nm, or from about 5 nm, to about 200 μm (200,000 nm), and an aspect ratio of about 1.

In one embodiment, the polysaccharide or polysaccharide derivative is characterized by a surface area in the range of from about 0.1 m²/g to about 200 m²/g, as determined by the Brunauer-Emmett-Teller (BET) measurement method. For example, the BET surface area can be 0.1, 0.2, 0.3, 0.4, 0.5, 0.6, 0.7, 0.8, 0.9, 1, 2, 3, 4, 5, 6, 7, 8, 9, 10, 15, 20 25, 30 35, 40 45, 50, 55, 60, 65, 70, 75, 80, 85, 90, 95, 100, 110, 120, 130, 140, 150, 160, 170, 180, 190, or 200 (or any value between 0.1 and 200) m²/g.

In a second embodiment, the enzymatically-produced polysaccharide has a zeta potential in the range of +2 mV to +50 mV. For example, the polysaccharide can have a zeta potential of +2, +3, +4, +5, +6, +7, +8, +9, +10, +12, +14, +16, +18, +20, +25, +30, +35, +40, +45, +50 (or any value between +2 and +50) mV. Zeta potential is an extrinsic property of a particle in liquid that arises from interactions between the surface and ions in the liquid. The measured value depends on temperature, the surface chemistry, and the type and concentration of ions in the liquid. When placed in water, ions will adsorb preferentially to the surface depending on the charge state of the surface. As counter ions move to maintain the electrical neutrality of the system, a "double layer" of opposing charges is set up around the particle. The zeta potential is defined to be the potential at the slip plane (which is equidistant between the adsorbed and diffuse charges). Since the zeta potential is related to the amount of charge on the surface of the particles, a strong zeta potential can help to stabilize the particles against agglomeration electrodynamically.

In a further embodiment, the polysaccharide comprises an enzymatically-produced polysaccharide or a derivative of an enzymatically-produced polysaccharide. Examples of enzymatically-produced polysaccharide include poly alpha-1,3-glucan; poly alpha-1,3-1,6-glucan; water insoluble alpha-(1,3-glucan) polymer having 90% or greater α-1,3-glycosidic linkages, less than 1 by weight of alpha-1,3,6-glycosidic branch points, and a number average degree of polymerization in the range of from 55 to 10,000; and enzymatically-produced water-insoluble cellulose having a weight average degree of polymerization (DPw) of about 10 to about 1000 and a cellulose II crystal structure.

In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows.

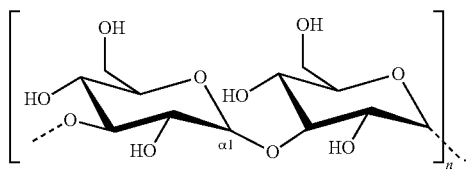

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1% or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In one embodiment, the polysaccharide is poly alpha-1,3-1,6-glucan. In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1.

The glycosidic linkage profile of a poly alpha-1,3-1,6-glucan herein can be determined using any method known in the art. For example, a linkage profile can be determined using methods that use nuclear magnetic resonance (NMR) spectroscopy (e.g., $^{13}$C NMR or $^1$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The terms "poly alpha-1,3-1,6-glucan", "alpha-1,3-1,6-glucan polymer", and "poly (alpha-1,3)(alpha-1,6) glucan" are used interchangeably herein (note that the order of the linkage denotations "1,3" and "1,6" in these terms is of no moment). Poly alpha-1,3-1,6-glucan herein is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. Poly alpha-1,3-1,6-glucan is a type of polysaccharide containing a mixed glycosidic linkage content. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

The "molecular weight" of a poly alpha-1,3-1,6-glucan herein can be represented as number-average molecular weight ($M_n$) or as weight-average molecular weight ($M_w$). Alternatively, molecular weight can be represented as Daltons, grams/mole, $DP_w$ (weight average degree of polymerization), or DPn (number average degree of polymerization). Various means are known in the art for calculating these molecular weight measurements such as with high-pressure liquid chromatography (HPLC), size exclusion chromatography (SEC), or gel permeation chromatography (GPC).

The term "poly alpha-1,3-1,6-glucan wet cake" herein refers to poly alpha-1,3-1,6-glucan that has been separated from a slurry and washed with water or an aqueous solution. Poly alpha-1,3-1,6-glucan is not completely dried when preparing a wet cake.

The term "aqueous solution" herein refers to a solution in which the solvent is water. Poly alpha-1,3-1,6-glucan can be dispersed, mixed, and/or dissolved in an aqueous solution. An aqueous solution can serve as the dispersion medium of a hydrocolloid herein.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their product are disclosed in published United States patent application 2015/0232785. The linkages and DPw of Glucan produced by various Gtf Enzymes, as disclosed in US 2015/0232785, are listed below in Table A.

TABLE A

Linkages and $DP_w$ of Glucan Produced by Various Gtf Enzymes

| Gtf | Glucan Alpha Linkages | | $DP_w$ |
|---|---|---|---|
| | %1,3 | %1,6 | |
| 4297 | 31 | 67 | 10540 |
| 3298 | 50 | 50 | 1235 |
| 0544 | 62 | 36 | 3815 |
| 5618 | 34 | 66 | 3810 |
| 2379 | 37 | 63 | 1640 |

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

A poly alpha-1,3-1,6-glucan herein can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan herein can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example. Poly alpha-1,3-1,6-glucan herein can be provided in the form of a powder when dry, or a paste, colloid or other dispersion when wet, for example.

In one embodiment, the polysaccharide comprises water-insoluble cellulose having a weight-average degree of polymerization ($DP_w$) of about 10 to about 1000 and a cellulose II crystal structure. Such cellulose, and methods for its preparation using a cellodextrin phosphorylase enzyme, are disclosed in published patent application WO 2016/106011, the disclosure of which is hereby incorporated in its entirety. As disclosed in WO 2016/106011, cellulose is produced by a cellodextrin phosphorylase enzyme directly as cellulose II. In contrast, cellulose produced in nature (e.g., in plants) typically is of a cellulose I structure and generally requires mercerization and/or other chemical treatments (e.g., derivatization followed by un-derivatization, formation of regenerated cellulose) to convert it into cellulose II. The dominant hydrogen bonds characterizing a cellulose II structure are O2-H—O6, O6-H—O6 and O2-H—O2, whereas cellulose I has O2-H—O6 as a dominant hydrogen bond. The structure of cellulose II comprises chain folding and is difficult to unravel. Cellulose II comprises anti-parallel chains, whereas in contrast, cellulose I chains are parallel.

Cellodextrin phosphorylase enzymes as disclosed in published patent application WO 2016/106011 can synthesize low molecular weight cellulose that is insoluble in aqueous compositions. For example, a cellodextrin phosphorylase as employed in an enzymatic reaction as disclosed in WO 2016/106011 can produce low molecular weight, insoluble cellulose.

Cellulose produced by a cellodextrin phosphorylase enzyme in certain embodiments can have a $DP_w$ or $DP_n$ of about 10-1000. For example, $DP_w$ or $DP_n$ of the cellulose can be about 10-500, 10-250, 10-100, 10-75, 10-50, 10-45, 10-40, 10-35, 10-30, 10-25, 15-50, 15-45, 15-40, 15-35, 15-30, or 15-25. $DP_w$ or $DP_n$ of cellulose in some aspects can be about, at least about, or less than about, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Cellulose produced by a cellodextrin phosphorylase enzyme in some aspects can have an $M_w$ of about 1700-170000, 1700-86000, 1700-43000, 1700-17000, 1700-13000, 1700-8500, 1700-6800, 1700-5100, 2550-5100, or 2550-4250. $M_w$ can be about, at least about, or less than about, 1700, 1900, 2100, 2300, 2500, 2700, 2900, 3100, 3300, 3500, 3700, 3900, 4100, 4300, 4500, 4700, 4900, or 5100 in some aspects.

About 100% of the glycosidic linkages of cellulose produced by a cellodextrin phosphorylase enzyme as disclosed in WO 2016/106011 are beta-1,4 linkages. Cellulose in other aspects can have a glycosidic linkage profile of at least about 90%, 91%, 92%, 93%, 94%, 95%, 96%, 97%, 98%, or 99% beta-1,4 linkages. Accordingly, cellulose enzymatically produced can have, for example, less than 10%, 9%, 8%, 7%, 6%, 5%, 4%, 3%, 2%, or 1% of glycosidic linkages that are other than beta-1,4.

The backbone of a cellulose synthesized by cellodextrin phosphorylase enzyme can be linear/unbranched. Alternatively, there can be branches in the cellulose. Thus, in certain embodiments, cellulose can have no branch points or less than about 5%, 4%, 3%, 2%, or 1% branch points as a percent of the glycosidic linkages in the polymer.

Cellulose produced by a cellodextrin phosphorylase enzyme can have a cellulose II crystal structure. For example, enzymatically-produced cellulose can comprise about 100% cellulose, by weight, that is of a cellulose II crystal structure. As other examples, enzymatically-produced cellulose can comprise at least about 80%, 81%, 82%, 83%, 84%, 85%, 86%, 87%, 88%, 89%, 90%, 91%, 92%, 93%, 94%, 95%, 96%, 97%, 98%, or 99% cellulose, by weight, that is of a cellulose II crystal structure. Enzymatically-produced cellulose in some aspects can comprise less than about 20%, 19%, 18%, 17%, 16%, 15%, 14%, 13%, 12%, 11%, 10%, 9%, 8%, 7%, 6%, 5%, 4%, 3%, 2%, or 1% cellulose material, by weight, that is of a cellulose I, III, and/or IV crystal structure. Cellulose II crystal structure has been described by Kolpak and Blackwell (*Macromolecules* 9:273-278) and Kroon-Batenburg and Kroon (*Glycoconjugate J.* 14:677-690), for example, both of which are incorporated herein by reference. The dominant hydrogen bonds characterizing a cellulose II structure are O2-H—O6, O6-H—O6 and O2-H—O2, whereas cellulose I has O2-H—O6 as a dominant hydrogen bond. The structure of cellulose II comprises chain folding and is difficult to unravel.

Cellulose is produced by a cellodextrin phosphorylase enzyme, as disclosed in WO 2016/106011, directly as cellulose II. In contrast, cellulose produced in nature (e.g., in plants) typically is of a cellulose I structure and generally requires mercerization and/or other chemical treatments (e.g., derivatization followed by un-derivatization, formation of regenerated cellulose) to convert it into cellulose II. Enzymatically-produced cellulose in certain embodiments is in the cellulose II crystal state under both aqueous and dry conditions.

Cellulose produced as disclosed in WO 2016/106011 is insoluble in aqueous solvents such as water. However, it can be soluble in solvents comprising dimethyl sulfoxide (DMSO) and/or N,N-dimethylacetamide (DMAc). Examples of such solvents include DMSO or DMAc alone or further comprising lithium chloride (LiCl) (e.g., DMSO/LiCl and DMAc/LiCl). A DMSO/LiCl solvent or DMSO/LiCl solvent herein can comprise about 0.5, 1, 2, 3, 4, 5, 6, 7, 8, 9, or 10 wt % LiCl, for example, or can be LiCl-saturated. The concentration of enzymatically-produced cellulose can be at about 0.1-30 wt %, 0.1-20 wt %, 0.1-10 wt %, or 0.1-5 wt %, for example, or can be at about, or at least about, 0.1, 0.3, 0.5, 1, 2, 3, 4, 5, 6, 7, 8, 9, 10, 15, 20, 25, or 30 wt % in a non-aqueous solvent such as one comprising DMSO and/or DMAc. DMSO- and DMAc-comprising solvents herein do not further comprise an acid in certain aspects. Cellulose can be dissolved in any of the foregoing DMSO- and DMAc-based solvents at a relatively low temperature, such as at 15-30° C., 20-30° C., or 20-25° C. (e.g., room temperature), for example.

Compositions comprising cellulose as disclosed in WO 2016/106011 are not believed to occur in nature, and can optionally be characterized as having a flake or flake-like shape at nanometer scale. Flake or flake-like shapes formed by the cellulose have nano-size dimensions; such shapes can appear as flat, thin pieces of material when using appropriate microscopic techniques such as disclosed in WO 2016/106011. In other aspects, such cellulose is not, nor has been, derivatized. Thus, the cellulose does not comprise added functional groups such as ether groups (e.g., carboxymethyl groups) or ester groups (e.g., acetate groups).

Enzymatically-produced cellulose can be produced by a method comprising:
  a) contacting at least water, glucose-1-phosphate (G1P), cellodextrin, and a cellodextrin phosphorylase enzyme comprising an amino acid sequence that is at least 90% identical to SEQ ID NO:2 or SEQ ID NO:6, as disclosed in WO 2016/106011, wherein insoluble cellulose is produced; and
  b) optionally, isolating the cellulose produced in step (a).

The contacting step can optionally be characterized as providing an enzymatic reaction comprising water, glucose-1-phosphate, cellodextrin, and a cellodextrin phosphorylase enzyme as disclosed. The contacting step in a cellulose production method can be performed in any number of ways. For example, the desired amount of G1P and/or cellodextrin (e.g., cellobiose) can first be dissolved in water (optionally, other components may also be added at this stage of preparation, such as buffer components), followed by addition of one or more cellodextrin phosphorylase enzymes. The reaction may be kept still, or agitated via stirring or orbital shaking, for example. The reaction can be, and typically is, cell-free.

Glucose-1-phosphate (G1P) provided in a contacting step of a cellulose production method can be providing directly via addition of isolated G1P (e.g., G1P obtained from a commercial source), for example. Alternatively, G1P can be provided in the contacting step by providing at least a second reaction, wherein the products of the second reaction comprise G1P (i.e., the second reaction produces G1P as a product). A "second reaction" refers to a reaction that is in addition to the cellodextrin phosphorylase reaction performed in the contacting step (can optionally be denoted as a "first reaction"), and which provides G1P substrate for the cellodextrin phosphorylase reaction. A second reaction can optionally be characterized as employing a "G1P-producing enzyme" such as a starch phosphorylase, sucrose phosphorylase, or cellodextrin phosphorylase (when catalyzing cellulose hydrolysis).

Examples of cellodextrin suitable for use in an enzymatic reaction as disclosed in WO 2016/106011 include cellobiose (DP2), cellotriose (DP3), cellotetraose (DP4), cellopentaose (DP5), and cellohexaose (DP6). Cellobiose is used as a cellodextrin in certain aspects. Other examples of suitable cellodextrin include glucose polymers of 7 or more beta-1,4-linked glucose monomers resulting from the breakdown (e.g., enzymatic breakdown) of cellulose. One or more (e.g., a mixture of 2, 3, 4 or more) of the above types of cellodextrin can be employed in some embodiments.

Cellulose of a composition as presently disclosed herein can be a product of a cellodextrin phosphorylase enzyme comprising, or consisting of, an amino acid sequence that is at least 90% identical to SEQ ID NO:2 or SEQ ID NO:6 as disclosed in WO 2016/106011. In other embodiments, cellulose can be a product of a cellodextrin phosphorylase enzyme that comprises, or consists of, an amino acid sequence that is 100% identical to, or at least 90%, 91%, 92%, 93%, 94%, 95%, 96%, 97%, 98%, or 99% A identical to, SEQ ID NO:2 or SEQ ID NO:6. Non-limiting examples of a cellodextrin phosphorylase enzyme comprising SEQ ID NO:2 include cellodextrin phosphorylase enzymes comprising, or consisting of, an amino acid sequence that is 100% identical to, or at least 90%, 91%, 92%, 93%, 94%, 95%, 96%, 97%, 98%, or 99% A identical to, SEQ ID NO:4 as disclosed in WO 2016/106011. Non-limiting examples of a cellodextrin phosphorylase enzyme comprising SEQ ID NO:6 include cellodextrin phosphorylase enzymes comprising, or consisting of, an amino acid sequence that is 100% identical to, or at least 90%, 91%, 92%, 93%, 94%, 95%, 96%, 97%, 98%, or 99% identical to, SEQ ID NO:8 as disclosed in WO 2016/106011. A variant cellodextrin phosphorylase enzyme (e.g., between 90-99% amino acid identity with SEQ ID NO:2, 4, 6, or 8 reference sequence) should have some of (e.g., at least 30%, 40%, 50%, 60%, 70%, 80% or 90% of), or all of, the enzymatic activity of the corresponding non-variant reference sequence.

In another embodiment, the polysaccharide comprises a composition comprising a poly alpha-1,3-glucan ester compound represented by Structure I:

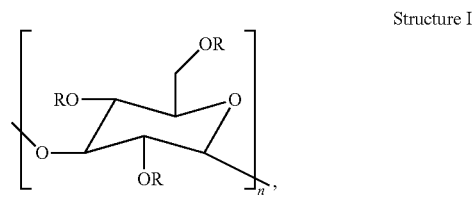

Structure I wherein
  (A) n is at least 6;
  (B) each R is independently an —H or a first group comprising —CO—$C_x$—COOH, wherein the —$C_x$— portion of said first group comprises a chain of 2 to 6 carbon atoms; and
  (C) the ester compound has a degree of substitution with the first group of about 0.001 to about 0.2.

Such poly alpha-1,3-glucan esters and their preparation are disclosed in published patent application WO 2017/003808, the disclosure of which is incorporated herein in its entirety.

A poly alpha-1,3-glucan ester compound of Structure I is termed an "ester" herein by virtue of comprising the substructure —$C_G$—O—CO—$C_x$—, where "—$C_G$—" represents carbon 2, 4, or 6 of a glucose monomeric unit of a poly alpha-1,3-glucan ester compound, and where "—CO—$C_x$" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds.

The terms "reaction", "esterification reaction", "reaction composition", "reaction preparation" and the like are used interchangeably herein and refer to a reaction comprising, or consisting of, poly alpha-1,3-glucan and at least one cyclic organic anhydride. A reaction is placed under suitable conditions (e.g., time, temperature, pH) for esterification of one or more hydroxyl groups of the glucose units of poly alpha-1,3-glucan with a first group provided by the cyclic organic anhydride, thereby yielding a poly alpha-1,3-glucan ester compound.

The terms "cyclic organic anhydride", "cyclic organic acid anhydride", and "cyclic acid anhydride" are used interchangeably herein. A cyclic organic anhydride herein can have a formula represented by Structure II shown below:

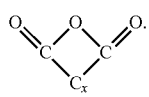

Structure II

The —$C_x$— portion of Structure II typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

The term "degree of substitution" (DoS) as used herein refers to the average number of hydroxyl groups substituted in each monomeric unit (glucose) of a poly alpha-1,3-glucan ester compound. Poly alpha-1,3-glucan ester compounds useful in preparing cellulose/polysaccharide composites as disclosed herein have a degree of substitution of about 0.001 to about 0.2. Alternatively, the DoS of a poly alpha-1,3-glucan ester compound can be about 0.001 to about 0.02, 0.025, 0.03, 0.035, 0.04, 0.05, 0.06, 0.07, 0.08, 0.09, 0.1, 0.15, or 2, for example. The DoS can optionally be expressed as a range between any two of these values. The structure, molecular weight and DoS of a poly alpha-1,3-glucan ester product can be confirmed using various physiochemical analyses known in the art such as NMR spectroscopy and size exclusion chromatography (SEC).

Each R group in the formula of a poly alpha-1,3-glucan ester compound represented by Structure I can independently be an —H or a first group comprising —CO—$C_x$—COOH. The —$C_x$— portion of the first group typically comprises a chain of 2 to 6 carbon atoms; each of these carbon atoms is preferably involved in four covalent bonds. In general, each carbon in the chain, aside from being covalently bonded with an adjacent carbon atom(s) in the chain or a carbon atom of the flanking C=O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$-chain (e.g., —CH=CH—), and/or be bonded to a hydrogen and an organic group (i.e., one hydrogen is substituted with an organic group). Skilled artisans would understand how the carbon atoms of the —$C_x$— portion of a first group comprising —CO—$C_x$—COOH can typically be bonded, given that carbon has a valency of four. It is contemplated that, in some embodiments, the —$C_x$— portion of the first group can comprise a chain of 2 to 16, 2 to 17, or 2 to 18 carbon atoms.

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. These first groups can be derived, respectively, by reacting succinic anhydride, glutaric anhydride, adipic anhydride, pimelic anhydride, or suberic anhydride with poly alpha-1,3-glucan.

The —$C_x$— portion of the first group (—CO—$C_x$—COOH) in some aspects can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH=CH—COOH, —CO—CH=CH—$CH_2$—COOH, —CO—CH=CH—$CH_2$—$CH_2$—COOH, —CO—CH=CH—$CH_2$—$CH_2$—$CH_2$—COOH, —CO—CH=CH—$CH_2$—$CH_2$—$CH_2$—$CH_2$—COOH, —CO—$CH_2$—CH=CH—COOH, —CO—$CH_2$—CH=CH—$CH_2$—COOH, —CO—$CH_2$—CH=CH—$CH_2$—$CH_2$—COOH, —CO—$CH_2$—CH=CH—$CH_2$—$CH_2$—$CH_2$—COOH, —CO—$CH_2$—$CH_2$—CH=CH—COOH, —CO—$CH_2$—$CH_2$—CH=CH—$CH_2$—COOH, —CO—$CH_2$—$CH_2$—CH=CH—$CH_2$—$CH_2$—COOH, —CO—$CH_2$—$CH_2$—$CH_2$—CH=CH—COOH, —CO—$CH_2$—$CH_2$—$CH_2$—CH=CH—$CH_2$—COOH, and —CO—$CH_2$—$CH_2$—$CH_2$—$CH_2$—CH=CH—COOH. Each of these first groups can be derived by reacting the appropriate cyclic organic anhydride with poly alpha-1,3-glucan. For example, to produce a first group comprising —CO—CH=CH—COOH, maleic anhydride can be reacted with poly alpha-1,3-glucan. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—$C_x$—COOH).

The —$C_x$— portion of the first group (—CO—$C_x$—COOH) in some aspects herein can comprise at least one branch comprising an organic group. Examples of a first group in which the —$C_x$— portion comprises at least one organic group branch include:

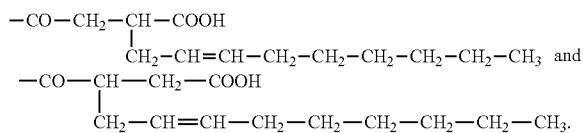

Each of these two first groups can be derived by reacting 2-nonen-1-yl succinic anhydride with poly alpha-1,3-glucan. It can be seen that the organic group branch (generically termed "$R^b$" herein) in both these examples is —$CH_2$—CH=CH—$CH_2$—$CH_2$—$CH_2$—$CH_2$—$CH_2$—$CH_3$. It can also be seen that the $R^b$ group substitutes for a hydrogen in the —$C_x$— carbon chain.

Thus, for example, a first group (—CO—$C_x$—COOH) herein can be any of —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, or —CO—$CH_2$—$CH_2$—$CH_2$—$CH_2$—$CH_2$—$CH_2$—COOH, but in which at least one, two, three, or more hydrogens thereof is/are substituted with an $R^b$ group. Also for example, a first group (—CO—C$_x$—COOH) herein can be any of —CO—CH═CH—CH$_2$—COOH, —CO—CH═CH—CH$_2$—CH$_2$—COOH, —CO—CH═CH—CH$_2$—CH$_2$—CH$_2$—COOH, —CO—CH═CH—CH$_2$—CH$_2$—CH$_2$—CH$_2$—COOH, —CO—CH$_2$—CH═CH—COOH, —CO—CH$_2$—CH═CH—CH$_2$—COOH, —CO—CH$_2$—CH═CH—CH$_2$—CH$_2$—COOH, —CO—CH$_2$—CH═CH—CH$_2$—CH$_2$—CH$_2$—COOH, —CO—CH$_2$—CH$_2$—CH═CH—COOH, —CO—CH$_2$—CH$_2$—CH═CH—CH$_2$—COOH, —CO—CH$_2$—CH$_2$—CH═CH—CH$_2$—CH$_2$—COOH, —CO—CH$_2$—CH$_2$—CH$_2$—CH═CH—COOH, —CO—CH$_2$—CH$_2$—CH$_2$—CH═CH—CH$_2$—COOH, or —CO—CH$_2$—CH$_2$—CH$_2$—CH$_2$—CH═CH—COOH, but in which at least one, two, three, or more hydrogens thereof is/are substituted with an R$^b$ group (such first groups are examples in which the —C$_x$— portion comprises at least one double-bond in the carbon atom chain and at least one branch comprising an organic group). Suitable examples of R$^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure II and its involvement in the esterification process to prepare poly alpha-1,3-glucan esters of Structure I herein as disclosed in WO 2017/003808, what particular cyclic organic anhydride is suitable for deriving any of these first groups.

As further disclosed below regarding processes for synthesizing a poly alpha-1,3-glucan ester compound, each of these first groups comprising a —C$_x$-portion with at least one organic group branch can be derived by reacting the appropriate cyclic organic anhydride with poly alpha-1,3-glucan. An illustrative example includes using methylsuccinic anhydride to ester-derivatize poly alpha-1,3-glucan, where the resultant first group is —CO—CH$_2$—CH(CH$_3$)—COOH or —CO—CH(CH$_3$)—CH$_2$—COOH. Thus, a cyclic organic anhydride comprising a —C$_x$-portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate).

A poly alpha-1,3-glucan ester compound represented by Structure I can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound of Structure I is preferably linear/unbranched. In certain embodiments, the compound has no branch points or less than about 10%, 9%, 8%, 7%, 6%, 5%, 4%, 3%, 2% or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

A cyclic organic anhydride herein can be, in some aspects, one in which the —C$_x$— portion of a formula represented by Structure II comprises at least one branch comprising an organic group. Examples of such cyclic organic anhydrides include those that would yield —CO—CH$_2$—CH(CH$_2$CH═CHCH$_2$CH$_2$CH$_2$CH$_2$CH$_3$)—COOH or —CO—CH(CH$_2$CH═CHCH$_2$CH$_2$CH$_2$CH$_2$CH$_3$)—CH$_2$—COOH as first groups. Other examples of such cyclic organic anhydrides include those that would yield —CO—CH$_2$—CH$_2$—COOH, —CO—CH$_2$—CH$_2$—CH$_2$—COOH, —CO—CH$_2$—CH$_2$—CH$_2$—CH$_2$—COOH, —CO—CH$_2$—CH$_2$—CH$_2$—CH$_2$—CH$_2$—COOH, or —CO—CH$_2$—CH$_2$—CH$_2$—CH$_2$—CH$_2$—CH$_2$—COOH as first groups, but in which at least one, two, three, or more hydrogens thereof is/are substituted with an organic group branch (R$^b$). Still other examples of such cyclic organic anhydrides include those that would yield —CO—CH═CH—CH$_2$—COOH, —CO—CH═CH—CH$_2$—CH$_2$—COOH, —CO—CH═CH—CH$_2$—CH$_2$—CH$_2$—COOH, —CO—CH═CH—CH$_2$—CH$_2$—CH$_2$—CH$_2$—COOH, —CO—CH$_2$—CH═CH—COOH, —CO—CH$_2$—CH═CH—CH$_2$—COOH, —CO—CH$_2$—CH═CH—CH$_2$—CH$_2$—COOH, —CO—CH$_2$—CH═CH—CH$_2$—CH$_2$—CH$_2$—COOH, —CO—CH$_2$—CH$_2$—CH═CH—COOH, —CO—CH$_2$—CH$_2$—CH═CH—CH$_2$—COOH, —CO—CH$_2$—CH$_2$—CH═CH—CH$_2$—CH$_2$—COOH, —CO—CH$_2$—CH$_2$—CH$_2$—CH═CH—COOH, —CO—CH$_2$—CH$_2$—CH$_2$—CH═CH—CH$_2$—COOH, or —CO—CH$_2$—CH$_2$—CH$_2$—CH$_2$—CH═CH—COOH as first groups, but in which at least one, two, three, or more hydrogens thereof is/are substituted with an $R^b$ group. Suitable examples of $R^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on a formula represented by Structure II and its involvement in the disclosed esterification process, what particular cyclic organic anhydride is suitable for deriving any of these first groups.

Examples of cyclic organic anhydrides by name that can be included in a reaction herein include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-ylsuccinic anhydride. In particular, for example, maleic anhydride can be used to esterify —CO—CH=CH—COOH as a first group to poly alpha-1,3-glucan; methylsuccinic anhydride can be used to esterify —CO—CH$_2$—CH(CH$_3$)—COOH and/or —CO—CH(CH$_3$)—CH$_2$—COOH as a first group to poly alpha-1,3-glucan; methylmaleic anhydride can be used to esterify —CO—CH=C(CH$_3$)—COOH and/or —CO—C(CH$_3$)=CH—COOH as a first group to poly alpha-1,3-glucan; dimethylmaleic anhydride can be used to esterify —CO—C(CH$_3$)=C(CH$_3$)—COOH as a first group to poly alpha-1,3-glucan; 2-ethyl-3-methylmaleic anhydride can be used to esterify —CO—C(CH$_2$CH$_3$)=C(CH$_3$)—COOH and/or —CO—C(CH$_3$)=C(CH$_2$CH$_3$)—COOH as a first group to poly alpha-1,3-glucan; 2-hexyl-3-methylmaleic anhydride can be used to esterify —CO—C(CH$_2$CH$_2$CH$_2$CH$_2$CH$_2$CH$_3$)=C(CH$_3$)—COOH and/or —CO—C(CH$_3$)=C(CH$_2$CH$_2$CH$_2$CH$_2$CH$_2$CH$_3$)—COOH as a first group to poly alpha-1,3-glucan; itaconic anhydride can be used to esterify —CO—CH$_2$—C(CH$_2$)—COOH and/or —CO—C(CH$_2$)—CH$_2$—COOH as a first group to poly alpha-1,3-glucan; 2-nonen-1-yl succinic anhydride can be used to esterify —CO—CH$_2$—CH(CH$_2$CH=CHCH$_2$CH$_2$CH$_2$CH$_2$CH$_3$)—COOH and/or —CO—CH(CH$_2$CH=CHCH$_2$CH$_2$CH$_2$CH$_2$CH$_3$)—CH$_2$—COOH as a first group to poly alpha-1,3-glucan.

One, two, three, or more cyclic organic anhydrides as presently disclosed can be used in an esterification reaction, for example. A cyclic organic anhydride can typically be obtained commercially in a concentrated (e.g., >95%, 96%, 97%, 98%, or 99% pure) form. The amount of cyclic organic anhydride in an esterification reaction herein can be selected to provide a composition comprising a poly alpha-1,3-glucan ester compound having a degree of substitution with the first group of about 0.001 to about 0.1.

As disclosed in WO 2017/003808, each of these first groups comprising a —C$_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—CH$_2$—CH(CH$_3$)—COOH or —CO—CH(CH$_3$)—CH$_2$—COOH. Still another illustrative example includes using methylmaleic anhydride to ester-derivatize poly alpha-1,3-glucan, where the resultant first group is —CO—CH=C(CH$_3$)—COOH or —CO—C(CH$_3$)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In another embodiment, the polysaccharide comprises a composition comprising a poly alpha-1,3-glucan ether compound represented by Structure III:

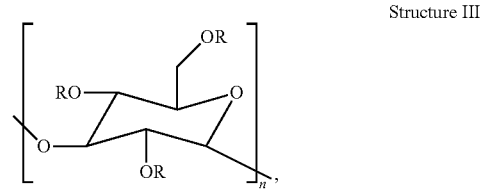

Structure III wherein
(D) n is at least 6,
(E) each R is independently an H or an organic group, and
(F) the ether compound has a degree of substitution (DoS) of about 0.001 to about 0.2. Compositions comprising a poly alpha-1,3-glucan ether compound as described here and having a DoS of about 0.05 to about 3 are disclosed in published patent application US 2014/0179913, the entire disclosure of which is hereby incorporated in its entirety. Poly alpha-1,3-glucan ether compounds having DoS of about 0.001 to about 0.2, or about 0.05 to about 0.2, or about 0.001 to about 0.1, or about 0.05 to about 0.1, can be prepared by adjusting the ratio of glucan and etherification agent. The organic group can be a hydroxy alkyl group, alkyl group, or carboxy alkyl group. The ether compound may contain one type of the organic group, or two or more types of the organic group. The organic group may be a hydroxypropyl, dihydroxypropyl, hydroxyethyl, methyl, ethyl, or carboxymethyl group, for example. In one embodiment, the poly alpha-1,3-glucan ether compounds have DoS of about 0.001 to about 0.2, or about 0.05 to about 0.2, or about 0.001 to about 0.1, or about 0.05 to about 0.1. In one embodiment, the organic group is a carboxymethyl group and the DoS is from about 0.001 to about 0.2. In another embodiment, the organic group is a carboxymethyl group and the DoS is from about 0.05 to about 0.1.

The polysaccharides can be used in any useful amount, for example an amount sufficient to impart the desired properties to the cellulose/polysaccharide composite. In one embodiment, the composite comprises from about 1 weight percent to about 99 weight percent polysaccharide, based on the total weight of the cellulose/polysaccharide composite. For example, the composite can comprise 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 91, 92, 93, 94, 95, 96, 97, 98, or 99 (or any value between 1 and 99) weight percent polysaccharide.

In an embodiment, the cellulose/polysaccharide composite comprises from about 1 to about 9 weight percent cellulose and from about 99 to about 91 weight percent poly alpha-1,3-glucan, based on the total weight of the composite. In another embodiment, the composite comprises from about 1 to about 25 weight percent cellulose and from about 99 to about 75 weight percent poly alpha-1,3-glucan. In another embodiment, the composite comprises from about 1 to about 50 weight percent cellulose and from about 99 to 50 weight percent poly alpha-1,3-glucan. In another embodiment, the composite comprises from about 25 to about 75 weight percent cellulose and from about 75 to about 25 weight percent poly alpha-1,3-glucan. In an additional embodiment, the composite comprises from about 45 to about 99 weight percent cellulose and from about 55 to about 1 percent poly alpha-1,3-glucan. In yet another embodiment, the composite comprises from about 51, or 52, or 53, or 54, or 55 weight percent to about 99 weight percent cellulose and from about 49, or 48, or 47, or 46, or 45 weight percent to about 1 weight percent poly alpha-1,3-glucan. In one embodiment, the polysaccharide comprises poly alpha-1,3-glucan, and the composite comprises from about 1 weight percent to about 49 weight percent poly alpha-1,3-glucan, based on the total weight of the composite.

In an additional embodiment, the cellulose/polysaccharide composite consists essentially of from about 99 to about 1 weight percent cellulose, and from about 1 to about 99 weight percent poly alpha-1,3-glucan, based on the total weight of the composite. In a further embodiment, the cellulose/polysaccharide composite consists essentially of from about 1 to about 9 weight percent cellulose and from about 91 to about 99 weight percent poly alpha-1,3-glucan, based on the total weight of the composite. In yet another embodiment, the cellulose/polysaccharide composite consists essentially of from about 51 to about 99 weight percent cellulose, and from about 1 to about 49 weight percent poly alpha-1,3-glucan.

In an embodiment, the cellulose/polysaccharide composite comprises from about 1 to about 9 weight percent cellulose and from about 91 to about 99 weight percent poly alpha-1,3-1,6-glucan, based on the total weight of the composite. In another embodiment, the composite comprises from about 1 to about 25 weight percent cellulose and from about 99 to about 75 weight percent poly alpha-1,3-1,6-glucan. In another embodiment, the composite comprises from about 1 to about 50 weight percent cellulose and from about 99 to 50 weight percent poly alpha-1,3-1,6-glucan. In another embodiment, the composite comprises from about 25 to about 75 weight percent cellulose and from about 75 to about 25 weight percent poly alpha-1,3-1,6-glucan. In an additional embodiment, the composite comprises from about 45 to about 99 weight percent cellulose and from about 55 to about 1 percent poly alpha-1,3-1,6-glucan. In another embodiment, the cellulose/polysaccharide composite comprises from about 51, or 52, or 53, or 54, or 55 to about 99 weight percent cellulose, and from about 1 to about 49, or 48, or 47, or 46, or 45 weight percent poly alpha-1,3-1,6-glucan. In one embodiment, the polysaccharide comprises poly alpha-1,3-1,6-glucan, and the composite comprises from about 1 weight percent to about 99 weight percent poly alpha-1,3-1,6-glucan, based on the total weight of the composite.

In an additional embodiment, the cellulose/polysaccharide composite consists essentially of from about 99 to about 1 weight percent cellulose, and from about 1 to about 99 weight percent poly alpha-1,3-1,6-glucan, based on the total weight of the composite. In a further embodiment, the cellulose/polysaccharide composite consists essentially of from about 1 to about 9 weight percent cellulose and from about 91 to about 99 weight percent poly alpha-1,3-1,6-glucan, based on the total weight of the composite. In yet another embodiment, the cellulose/polysaccharide composite consists essentially of from about 51 to about 99 weight percent cellulose, and from about 1 to about 49 weight percent poly alpha-1,3-1,6-glucan.

In an embodiment, the cellulose/polysaccharide composite comprises from about 1 to about 9 weight percent cellulose and from about 91 to about 99 weight percent water-insoluble cellulose having a weight-average degree of polymerization ($DP_w$) of about 10 to about 1000 and a cellulose II crystal structure, based on the total weight of the composite. In another embodiment, the composite comprises from about 1 to about 25 weight percent cellulose and from about 99 to about 75 weight percent water-insoluble cellulose having a weight-average degree of polymerization ($DP_w$) of about 10 to about 1000 and a cellulose II crystal structure. In another embodiment, the composite comprises from about 1 to about 50 weight percent cellulose and from about 99 to 50 weight percent water-insoluble cellulose having a weight-average degree of polymerization ($DP_w$) of about 10 to about 1000 and a cellulose II crystal structure. In another embodiment, the composite comprises from about 25 to about 75 weight percent cellulose and from about 75 to about 25 weight percent water-insoluble cellulose having a weight-average degree of polymerization ($DP_w$) of about 10 to about 1000 and a cellulose II crystal structure. In an additional embodiment, the composite comprises from about 45 to about 99 weight percent cellulose and from about 55 to about 1 percent water-insoluble cellulose having a weight-average degree of polymerization ($DP_w$) of about 10 to about 1000 and a cellulose II crystal structure. In another embodiment, the cellulose/polysaccharide composite comprises from about 51, or 52, or 53, or 54, or 55 to about 99 weight percent cellulose, and from about 1 to about 49, or 48, or 47, or 46, or 45 weight percent water-insoluble cellulose having a weight-average degree of polymerization ($DP_w$) of about 10 to about 1000 and a cellulose II crystal structure. In one embodiment, the polysaccharide comprises water-insoluble cellulose having a weight-average degree of polymerization (DPw) of about 10 to about 1000 and a cellulose II crystal structure, and the composite comprises from about 1 weight percent to about 99 weight percent polysaccharide, based on the total weight of the composite.

In an additional embodiment, the cellulose/polysaccharide composite consists essentially of from about 99 to about 1 weight percent cellulose, and from about 1 to about 99 weight percent water-insoluble cellulose having a weight-average degree of polymerization ($DP_w$) of about 10 to about 1000 and a cellulose II crystal structure, based on the total weight of the composite. In a further embodiment, the cellulose/polysaccharide composite consists essentially of from about 1 to about 9 weight percent cellulose and from about 91 to about 99 weight percent water-insoluble cellulose having a weight-average degree of polymerization ($DP_w$) of about 10 to about 1000 and a cellulose II crystal structure, based on the total weight of the composite. In yet another embodiment, the cellulose/polysaccharide composite consists essentially of from about 51 to about 99 weight percent cellulose, and from about 1 to about 49 weight percent poly water-insoluble cellulose having a weight-average degree of polymerization ($DP_w$) of about 10 to about 1000 and a cellulose II crystal structure.

In an embodiment, the cellulose/polysaccharide composite comprises from about 1 to about 9 weight percent cellulose and from about 91 to about 99 weight percent of a composition comprising a poly alpha-1,3-glucan ester compound represented by Structure I as defined herein, based on the total weight of the composite. In another embodiment, the composite comprises from about 1 to about 25 weight percent cellulose and from about 99 to about 75 weight percent of a composition comprising a poly alpha-1,3-glucan ester compound represented by Structure I as defined herein. In another embodiment, the composite comprises from about 1 to about 50 weight percent cellulose and from about 99 to 50 weight percent of a composition comprising a poly alpha-1,3-glucan ester compound represented by Structure I as defined herein. In another embodiment, the composite comprises from about 25 to about 75 weight percent cellulose and from about 75 to about 25 weight percent of a composition comprising a poly alpha-1,3-glucan ester compound represented by Structure I as defined herein. In an additional embodiment, the composite comprises from about 45 to about 99 weight percent cellulose and from about 55 to about 1 percent of a composition comprising a poly alpha-1,3-glucan ester compound represented by Structure I as defined herein. In another embodiment, the cellulose/polysaccharide composite comprises from about 51, or 52, or 53, or 54, or 55 to about 99 weight percent cellulose, and from about 1 to about 49, or 48, or 47, or 46, or 45 weight percent of a composition comprising a poly alpha-1,3-glucan ester compound represented by Structure I as defined herein. In one embodiment, the polysaccharide comprises a composition comprising a poly alpha-1,3-glucan ester compound represented by Structure I as defined herein, and the composite comprises from about 1 weight percent to about 99 weight percent of the composition comprising a poly alpha-1,3-ester compound, based on the total weight of the composite.

In an additional embodiment, the cellulose/polysaccharide composite consists essentially of from about 99 to about 1 weight percent cellulose, and from about 1 to about 99 weight percent of a composition comprising a poly alpha-1,3-glucan ester compound represented by Structure I as defined herein, based on the total weight of the composite. In a further embodiment, the cellulose/polysaccharide composite consists essentially of from about 1 to about 9 weight percent cellulose and from about 91 to about 99 weight percent of a composition comprising a poly alpha-1,3-glucan ester compound represented by Structure I as defined herein, based on the total weight of the composite. In yet another embodiment, the cellulose/polysaccharide composite consists essentially of from about 51 to about 99 weight percent cellulose, and from about 1 to about 49 weight percent of a composition comprising a poly alpha-1,3-glucan ester compound represented by Structure I as defined herein.

In an embodiment, the cellulose/polysaccharide composite comprises from about 1 to about 9 weight percent cellulose and from about 91 to about 99 weight percent of a composition comprising a poly alpha-1,3-glucan ether compound represented by Structure III as defined herein, based on the total weight of the composite. In another embodiment, the composite comprises from about 1 to about 25 weight percent cellulose and from about 99 to about 75 weight percent of a composition comprising a poly alpha-1,3-glucan ether compound represented by Structure III as defined herein. In another embodiment, the composite comprises from about 1 to about 50 weight percent cellulose and from about 99 to 50 weight percent of a composition comprising a poly alpha-1,3-glucan ether compound represented by Structure III as defined herein. In another embodiment, the composite comprises from about 25 to about 75 weight percent cellulose and from about 75 to about 25 weight percent of a composition comprising a poly alpha-1,3-glucan ether compound represented by Structure III as defined herein. In an additional embodiment, the composite comprises from about 45 to about 99 weight percent cellulose and from about 55 to about 1 percent of a composition comprising a poly alpha-1,3-glucan ether compound represented by Structure III as defined herein. In another embodiment, the cellulose/polysaccharide composite comprises from about 51, or 52, or 53, or 54, or 55 to about 99 weight percent cellulose, and from about 1 to about 49, or 48, or 47, or 46, or 45 weight percent of a composition comprising a poly alpha-1,3-glucan ether compound represented by Structure III as defined herein. In one embodiment, the polysaccharide comprises a composition comprising a poly alpha-1,3-glucan ether compound represented by Structure III as defined herein, and the composite comprises from about 1 weight percent to about 99 weight percent of the composition comprising a poly alpha-1,3-ether compound, based on the total weight of the composite.

In an additional embodiment, the cellulose/polysaccharide composite consists essentially of from about 99 to about 1 weight percent cellulose, and from about 1 to about 99 weight percent of a composition comprising a poly alpha-1,3-glucan ether compound represented by Structure III as defined herein, based on the total weight of the composite. In a further embodiment, the cellulose/polysaccharide composite consists essentially of from about 1 to about 9 weight percent cellulose and from about 91 to about 99 weight percent of a composition comprising a poly alpha-1,3-glucan ether compound represented by Structure III as defined herein, based on the total weight of the composite. In yet another embodiment, the cellulose/polysaccharide composite consists essentially of from about 51 to about 99 weight percent cellulose, and from about 1 to about 49 weight percent of a composition comprising a poly alpha-1,3-glucan ether compound represented by Structure III as defined herein.

In another embodiment, the composite further comprises inorganic particles. In one embodiment, the composite further comprises inorganic particles selected from titanium dioxide, calcium carbonate, mica, vermiculite, silica, kaolin, talc, or a mixture thereof. Addition of these particles to the cellulose and polysaccharide can impart properties such as improved printability, appearance, thermal conductivity, and dimensional stability to the cellulose/polysaccharide composite and articles comprising the composite.

In another embodiment, the composite further comprises a retention agent. Typically, a retention agent can be used to improve the retention of fine particles of cellulose pulp and/or polysaccharide in the composite. The composite may further comprise additives such as cationic starch, latex, flocculating agents. In one embodiment the composite further comprises cationic starch, latex, a flocculating agent, or a retention agent.

In one embodiment, a process for making cellulose/polysaccharide composites is disclosed. A cellulose/polysaccharide composite can be made by a process comprising the steps of a) dispersing cellulose pulp and an enzymatically-produced polysaccharide, a derivative of an enzymatically-produced polysaccharide, or a mixture thereof, in an aqueous medium to form a slurry; b) forming a cellulose/polysaccharide composite by filtering off the aqueous medium to form a wet composite; and c) drying the wet composite to obtain a dry composite. The resulting cellulose/polysaccharide composite can be formed on equipment of any scale, from laboratory screens to commercial-sized papermaking machinery, including such commonly used machines as Fourdrinier or inclined wire paper machines. The concentration of cellulose pulp and polysaccharide in the slurry can range from 0.01 to 15 weight percent, based on the total weight of the slurry.

Typically, the aqueous medium of the slurry is predominantly water, but may include various other components such as pH-adjusting components, forming aids, surfactants, defoamers, cationic starch, latex, flocculating agents, or retention agents. In one embodiment, the aqueous medium of the slurry comprises cationic starch, latex, flocculating agents, or retention agents. The aqueous medium can be drained from the slurry by moving the slurry onto a screen or other perforated support, retaining the dispersed solids and passing the liquid through to yield a wet cellulose/polysaccharide composite. The wet composite, once formed on the support, is usually further dewatered by vacuum or other pressure forces. The wet composite may optionally be dried by any suitable method known in the art. For example, air drying, convection drying, linear tunnel drying, arc drying, air-loop drying, contact drying, conduction drying, radiant energy drying, infrared drying, microwave drying, or a combination thereof may be used.

In one embodiment, the process further comprises a step d) treating the wet composite obtained in step b) or the dry composite obtained in step c) with an aqueous NaOH or KOH solution. Treatment of the composite with an aqueous base which can significantly swell or partially dissolve the polysaccharide contained in the composite can improve some of the properties of the composite, for example decreasing the porosity of the composite. The NaOH or KOH solution typically contains from about 2-3 weight percent up to about 10-15 weight percent of the base. The base treatment of the cellulose/polysaccharide composite can be by any convenient means, such as dipping the composite in the aqueous base solution or spraying the aqueous base solution on the composite.

After treatment with the aqueous NaOH or KOH solution, the composite is treated with a dilute acidic solution, for example 2 wt % acetic acid, to neutralize any remaining base. The composite can be rinsed with or dipped in the acidic solution. The composite is then washed with water to remove any remaining acid. The composite can be dried in an additional step of the process.

Once the composite is formed, it can be calendered if desired. Calendering is a finishing process used on cloth, paper, or plastic film to smooth, coat, or thin the material. In paper manufacturing, calendering produces a smooth, uniform surface more suitable for writing and many printing processes, and can also increase the density and strength of the paper.

Generally, the cellulose/polysaccharide composite is calendered in the nip between metal-metal, metal-composite, or composite-composite rolls. Also, several nips in the raw can be used, as for example, in a super calendar. Alternatively, the composite can be compressed in a platen press at a pressure, temperature, and time that are optimal for a particular composition and final application. Calendering paper in this manner also decreases the porosity of the formed paper. In the calendering process, the composite can be passed through nips and rollers one or more times.

In the process to make the cellulose/polysaccharide composite, the polysaccharide can be used as a dry powder, for example, containing less than 15%, or 10%, or 5% by weight or water, or in other embodiments, the polysaccharide can be used a wet cake, containing greater than 5%, or 10%, or 15% by weight of water. In another embodiment, the polysaccharide can be used in the form of a colloidal dispersion, which can be prepared as disclosed in published patent application WO 2016/126685, the disclosure of which is incorporated herein by reference in its entirety. In yet another embodiment, the polysaccharide can be used in the form of fibrids, which can be prepared as disclosed in published patent application WO 2016/196022, the disclosure of which is incorporated herein by reference in its entirety.

The term "fibrids", as used herein, means nongranular, fibrous or film-like particles with at least one of their three dimensions being of minor magnitude relative to the largest dimension. In some embodiments, the polysaccharide or polysaccharide derivative can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000.

The cellulose/polysaccharide composites disclosed herein are useful in forming articles. In one embodiment, the article is paper, packaging material, or insulating material. In another embodiment, the article is paper, packaging material, insulating material, a paper cup, a paper plate, an egg carton, or molded cellulose packaging material. The composite can be useful in articles for applications where improved barrier properties and enhanced mechanical performance are desired.

Non-limiting examples of the embodiments disclosed herein include:

1. A cellulose/polysaccharide composite comprising:
   a) cellulose; and
   b) an enzymatically-produced polysaccharide, a derivative of an enzymatically-produced polysaccharide, or a mixture thereof;
   wherein the enzymatically-produced polysaccharide and the polysaccharide derivative are water-insoluble.

2. The composite of embodiment 1, wherein the enzymatically-produced polysaccharide comprises:
   i) poly alpha-1,3-glucan;
   ii) poly alpha-1,3-1,6-glucan;
   iii) alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
   iv) water-insoluble cellulose having a weight-average degree of polymerization ($DP_w$) of about 10 to about 1000 and a cellulose II crystal structure.

3. The composite of embodiment 1 or 2, wherein the polysaccharide or polysaccharide derivative comprises particles having an average particle size in at least one dimension in the range of from about 20 nm to about 200 μm.

4. The composite of embodiment 1, 2, or 3, wherein the polysaccharide or polysaccharide derivative is characterized by a surface area in the range of from about 0.1 m²/g to about 200 m²/g, as determined by Brunauer-Emmett-Teller measurement method.

5. The composite of embodiment 1, 2, 3, or 4, wherein the polysaccharide comprises poly alpha-1,3-glucan, and the composite comprises from about 1 weight percent to about 49 weight percent poly alpha-1,3-glucan, based on the total weight of the composite.

6. The composite of embodiment 1, 2, 3, or 4, wherein the polysaccharide comprises poly alpha-1,3-1,6-glucan, and wherein the composite comprises from about 1 weight percent to about 99 weight percent poly alpha-1,3-1,6-glucan, based on the total weight of the composite.

7. The composite of embodiment 1, 2, 3, or 4, wherein the polysaccharide comprises water-insoluble cellulose having a weight-average degree of polymerization (DP$_w$) of about 10 to about 1000 and a cellulose II crystal structure, and wherein the composite comprises from about 1 weight percent to about 99 weight percent polysaccharide, based on the total weight of the composite.

8. The composite of embodiment 1, 2, 3, or 4, wherein the polysaccharide derivative comprises:
   v) a composition comprising a poly alpha-1,3-glucan ester compound represented by Structure I:

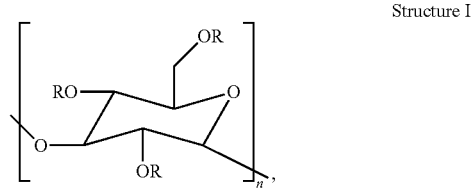

Structure I wherein
(A) n is at least 6;
(B) each R is independently an —H or a first group comprising —CO—C$_x$—COOH, wherein the —C$_x$— portion of said first group comprises a chain of 2 to 6 carbon atoms; and
(C) the compound has a degree of substitution with the first group of about 0.001 to about 0.2; and wherein the composite comprises from about 1 weight percent to about 99 weight percent polysaccharide derivative, based on the total weight of the composite.

9. The composite of embodiment 1, 2, 3, or 4, wherein the polysaccharide derivative comprises:
   vi) a composition comprising a poly alpha-1,3-glucan ether compound represented by Structure III:

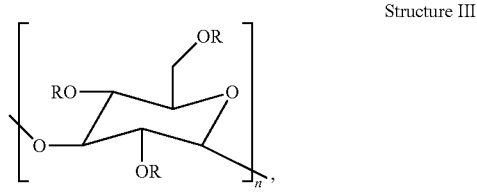

Structure III wherein
(D) n is at least 6,
(E) each R is independently an H or an organic group, and
(F) the ether compound has a degree of substitution (DoS) of about 0.001 to about 0.2; and wherein the composite comprises from about 1 weight percent to about 99 weight percent polysaccharide derivative, based on the total weight of the composite.

10. The composite of embodiment 1, 2, 3, 4, 5, 6, 7, 8, or 9, further comprising inorganic particles selected from titanium dioxide, calcium carbonate, mica, vermiculite, silica, kaolin, talc, or a mixture thereof.

11. The composite of embodiment 1, 2, 3, 4, 5, 6, 7, 8, 9, or 10, further comprising cationic starch, latex, flocculating agents, or retention agents.

12. An article comprising a cellulose/polysaccharide composite of embodiment 1, 2, 3, 4, 5, 6, 7, 8, 9, 10, or 11.

13. The article of embodiment 12, wherein the article is paper, packaging material, insulating material, a paper cup, a paper plate, an egg carton, or molded cellulose packaging material.

14. A process for making a cellulose/polysaccharide composite of embodiment 1, 2, 3, 4, 5, 6, 7, 8, 9, 10, 11, 12, or 13, the process comprising the steps of:
   a) dispersing cellulose pulp and an enzymatically-produced polysaccharide, a derivative of an enzymatically-produced polysaccharide, or a mixture thereof, in an aqueous medium to form a slurry;
   b) forming a cellulose/polysaccharide composite by filtering off the aqueous medium to form a wet composite; and
   c) drying the wet composite to obtain a dry composite;
wherein
   the polysaccharide comprises:
   i) poly alpha-1,3-glucan;
   ii) poly alpha-1,3-1,6-glucan;
   iii) alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
   iv) water-insoluble cellulose having a weight-average degree of polymerization (DP$_w$) of about 10 to about 1000 and a cellulose II crystal structure; and the polysaccharide derivative comprises:
   v) a composition comprising a poly alpha-1,3-glucan ester compound represented by Structure

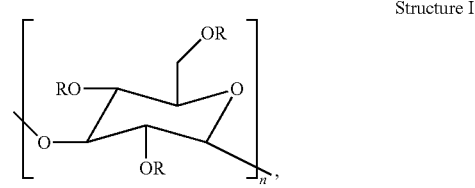

Structure I wherein
(A) n is at least 6;
(B) each R is independently an —H or a first group comprising —CO—C$_x$—COOH, wherein the —C$_x$— portion of said first group comprises a chain of 2 to 6 carbon atoms; and
(C) the compound has a degree of substitution with the first group of about 0.001 to about 0.2; or vi) a composition comprising a poly alpha-1,3-glucan ether compound represented by Structure

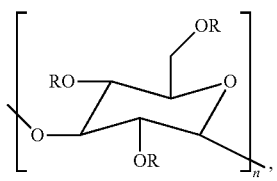

Structure III wherein
(D) n is at least 6,
(E) each R is independently an H or an organic group, and
(F) the ether compound has a degree of substitution (DoS) of about 0.001 to about 0.2.

15. The process of embodiment 14, further comprising a step d) treating the wet composite obtained in step b) or the dry composite obtained in step c) with an aqueous NaOH or KOH solution.

EXAMPLES

Unless otherwise noted, all materials were used as received.

As used herein, "Comp. Ex." Means Comparative Example; "Ex." means Example, "wt %" means weight percent.

Representative Preparation of Poly Alpha-1,3-Glucan

U.S. Pat. No. 7,000,000 disclosed a polysaccharide fiber comprising hexose units wherein at least 50% of the hexose units within the polymer were linked via alpha-1,3-glycosidic linkages using a *Streptococcus salivarius* gtfJ enzyme. This enzyme utilizes sucrose as a substrate in a polymerization reaction producing poly alpha-1,3-glucan and fructose as end-products.

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Polysaccharide Samples

Two samples of enzyme-polymerized poly alpha-1,3-glucan were used to prepare cellulose/polysaccharide composites. The polysaccharides were linear in molecular structure and water-insoluble. Both samples of poly alpha-1,3-glucan were recovered as wet cakes from the downstream processing. Polysaccharide A had a moisture content of 64% as wet cake, and Polysaccharide B had a moisture content of 83% as wet cake. Each wet cake polysaccharide was then subjected (separately) to high shear mixing to form a colloidal dispersion, and used as described below to form cellulose/polysaccharide composites (see section on Lab Preparation of Cellulose/Polysaccharide Paper Sheets).

The specific surface areas of the polysaccharides, as measured by Brunauer-Emmett-Teller (BET) technique, are shown in Table 1 along with their moisture content (as wet cake), and crystallinity.

TABLE 1

| Polysaccharides Used | | |
|---|---|---|
| Property | Polysaccharide A | Polysaccharide B |
| Moisture content (%) * | 64 | 83 |
| BET Surface area (m²/g) | 9.7 | 19.4 |
| Crystallinity | 65% | 65% |

Note:
* of the wet cake

Methods

Moisture content of the polysaccharides was determined using an automatic moisture analyzer (Ohaus MB25 moisture analyzer) by weight difference.

The BET surface area of the polysaccharides was determined using the following procedure. Nitrogen adsorption/desorption measurements were performed at 77.3 K. on a Micromeritics ASAP model 2420 porosimeter. Samples were degassed at the above temperature for 12 h at <100 μm Hg prior to data collection. Surface area measurements utilized a five-point adsorption isotherm collected over 0.05 to 0.20 $P/P_0$ and analyzed via the BET method [S. Brunauer, P. H. Emmett and E. Teller, J. Amer. Chem. Soc., 60, 309(1938)]. Pore volume distributions utilized a multi-point desorption isotherm and were analyzed via the BJH method [E. P. Barrett, L. G. Joyner and P. P. Halenda, *J. Amer. Chem. Soc.*, 73, 373(1951).] P is the pressure of the gas above the sample (generally at liquid nitrogen BP temperature); $P_0$ is the saturation gas pressure at the temperature of the sample being measured (typically 760 Torr for nitrogen at 77.3 K).

The crystallinity of the polysaccharides was determined by wide angle x-ray scattering (WAXS) using the following procedures.

Glucan powder samples were dried for a minimum of two hours or overnight in a vacuum oven set at 60° C. Sometimes samples were dried over a weekend. Right before starting the diffraction scan, the sample was removed from the oven and transferred into a stainless steel holder with a well of about 1.5 cm wide by 4 cm long by 4 mm deep. The well was open at the side such that the powder could be poured in through the side, with a glass plate clipped onto the top of the holder. The powder was packed down several times throughout the filling process by hitting the opposite side of the holder against the table repeatedly. Finally, the holder was turned right-side-up, the glass plate was removed, and the holder was loaded into the diffractometer. The time from the opening of the oven to the start of the scan should be five minutes or less.

A PANalytical X'Pert MPD Powder Diffractometer in reflection mode was used to measure the X-ray diffraction pattern of the powders. The X-ray source was a Cu X-ray tube line source with an optical focusing mirror and a 1/16° narrowing slit. X-rays were detected with a 1D detector and an anti-scatter slit set at 1/8°. Data was collected in the range of 4 to 60 degrees of two-theta at 0.1 degrees per step. The scan took about 46 minutes in total.

The resulting X-ray pattern was then analyzed by subtracting a linear baseline from 7.2 to 30.5 degrees, subtracting the XRD pattern of a known amorphous glucan sample which had been scaled to fit the current data, and then fitting the remaining crystal peaks in that range with a series of Gaussian curves corresponding to known dehydrated glucan crystal reflections. The area corresponding to the crystal peaks was then divided by the total area under the baseline-subtracted curve to yield a crystallinity index.

The following testing methods were used to evaluate the properties of the cellulose/polysaccharide composites:

ISO 536: 2012-07 Paper and board—Determination of grammage.

ISO 534: 2011-11 Paper and board—Determination of thickness, density and specific volume ISO 1924-2: 2008-12 Paper and board—Determination of tensile properties —Part 2: Constant rate of elongation method (20 mm/min)

ISO 1974: 2012-05 Paper—Determination of tearing resistance —Elmendorf method

DIN 53120-1: 1998-06 Testing of paper and board— Determination of air permeability—Part 1: Medium rate of air permeability according to Bendtsen Lab Preparation of Cellulose/Polysaccharide Paper Sheets:

Glucan dispersion was prepared as follows. A slurry was prepared by using a mixer (Eurostar power-b IKA-Werke with Dispermat disc) at about 1000 rpm for 20 minutes. The slurry was further mixed in an Ultra Turrax (rotor stator mixer, Janke & Kunkel IKA Laboratory Equipment Ultra-Turrax T50) to homogenize the suspension (2 minutes at 7000 rpm). A dispersion was obtained at 2.5 wt % solid as a result (50 grams dry polymer base for a total and 1950 grams of water).

Cellulose pulp was prepared as follows (ISO 5263-1: 2004-09: Laboratory wet disintegration —Part 1: Disintegration of chemical pulps): 20 grams (dry weight based) of pulp (a mixture of 50% eucalyptus pulp and 50% pine spruce pulp) was slurried in a pulp disintegrator (Messmer Instruments Limited M158 Disintegrator MK.IIIC) for 25 minutes at 75,000 rpm in 2 liters of tap water.

A cellulose pulp/polysaccharide slurry was prepared by combining the pulp slurry and the glucan dispersion with additional water to form a final composition of 40 grams dry solid material in 10,000 liters of tap water in a mixer (Frank PTI Laboratory Equipment Distributor for pulp suspensions (12 Liter)). Note that a 20% excess polysaccharide was added relative to the final target composition to account for retention losses.

Retention agent preparation was performed as follows. 2.48 mL of retention agent (Polymin VT 1% stock solution) was added into each slurry used to make cellulose/polysaccharide paper sheet.

Hand sheet paper making was performed as follows (ISO 5269-2: 2004-11: Preparation of laboratory sheets for physical testing —Part 2: Rapid-Köthen method): Hand sheet papers were formed by dewatering the cellulose pulp and polysaccharide mixtures in a had sheet former (Estanit HAAGE Rapid-Köthen Sheet former) and dried in a vacuum drier (Estanit HAAGE Rapid-Köthen Vacuum dryer) for 15 minutes at 94° C.

The cellulose/polysaccharide paper sheets were treated with NaOH according to the following procedure. The paper sheet was supported on screens and immersed in 2.5 wt % NaOH for 60 seconds. The paper was then transferred to a 2% acetic acid solution to neutralize NaOH, and then washed further with water until neutral pH was attained. The paper was pre-dried for 4 minutes at room temperature and then transferred to a vacuum dryer (Estanit HAAGE Rapid-Köthen Vacuum dryer) for 8 minutes.

Comparative Example A paper sheet (control) was prepared the same way except that no polysaccharide was used.

Compositions of the papers and their properties are presented in the following tables.

TABLE 2

Composition and Properties of Papers Made with Cellulose Pulp and Glucan.

| Example | Polysaccharide | Cellulose wt % | Glucan wt % | Grammage g/m² | Density g/cm³ | Tensile Strength N | Stretching % | Tensile Index Nm/g | Tear Strength mN | Air Permeability μm/Pas |
|---|---|---|---|---|---|---|---|---|---|---|
| Comp. Ex. A | B | 100 | 0 | 80.2 | 0.57 | 53.8 | 2.2 | 44.8 | 726 | 11.600 |
| 1 | B | 70 | 30 | 82.5 | 0.71 | 75.9 | 3.2 | 61.3 | 489 | 0.096 |
| 2 | B | 57 | 43 | 81.5 | 0.76 | 72.9 | 2.1 | 59.5 | 346 | 0.005 |
| 3 | B | 50 | 50 | 85.6 | 0.85 | 73.4 | 1.6 | 56.8 | 260 | 0.003 |
| 4 | B | 25 | 75 | 80.7 | 0.85 | 57.5 | 1.1 | 47.4 | 179 | 0.003 |
| 5 | A | 70 | 30 | 82.1 | 0.61 | 43.3 | 2.7 | 35.1 | 465 | 21.750 |
| 6 | A | 50 | 50 | 82.3 | 0.61 | 32.3 | 2.4 | 26.2 | 320 | 39.200 |

TABLE 3

Properties of Cellulose/Glucan Papers After Treatment with NaOH

| Example | Polysaccharide | Cellulose wt % | Glucan wt % | Grammage g/m² | Density g/cm³ | Tensile Strength N | Stretching % | Tensile Index Nm/g | Tear Strength mN | Air Permeability μm/Pas |
|---|---|---|---|---|---|---|---|---|---|---|
| Comp. Ex. A | B | 100 | 0 | 87.2 | 0.56 | 34.6 | 2.2 | 27.6 | 624 | 25.200 |
| 1 | B | 70 | 30 | 86.7 | 0.88 | 78.8 | 2.7 | 60.6 | 401 | 0.003 |
| 2 | B | 57 | 43 | 87.3 | 0.91 | 74.9 | 3.5 | 55.2 | 342 | 0.003 |
| 3 | B | 50 | 50 | 90.5 | 0.97 | 65.5 | 2.0 | 50.1 | 271 | 0.003 |
| 4 | B | 25 | 75 | 80.8 | 1.02 | 54.2 | 1.6 | 44.7 | 207 | 0.003 |
| 5 | A | 70 | 30 | 84.0 | 0.80 | 64.5 | 3.6 | 51.2 | 412 | 0.063 |
| 6 | A | 50 | 50 | 89.4 | 0.86 | 37.1 | 3.2 | 27.7 | 401 | 0.003 |

Overall, very high loading of polysaccharide (up to 75%) in the cellulose/polysaccharide composite was demonstrated without major property loss. In particular, Polysaccharide B was able to increase significantly tensile strength (up to 40%) while increasing elongation and reducing air permeability (by as much as six orders of magnitude) (see Table 2). All the papers containing glucan had improved tensile strength over the control when treated with NaOH. Also, compared to untreated paper, the reduction in air permeability was remarkable in all compositions tested (in all cases, six order of magnitude reduction—see Table 3). Such low permeability, strong (high tensile index and high elongation) papers are attractive in applications where barrier to moisture, oxygen, and mineral oil are desired. Although some of these barrier properties can be achieved by coating an appropriate thermoplastic polymer on paper, the cellulose/polysaccharide composite is uniquely advantaged in applications where bio-based (renewable) and biodegradable products are desired.

What is claimed is:

1. An article comprising a composite, wherein the composite comprises:
   (a) cellulose, and
   (b) poly alpha-1,3-glucan, wherein the poly alpha-1,3-glucan is water-insoluble, and at least 50% of the glycosidic linkages of the poly alpha-1,3-glucan are alpha-1,3 glycosidic linkages;
   wherein the article is a paper, packaging material, insulating material, paper cup, paper plate, or egg carton.

2. The article of claim 1, wherein the poly alpha-1,3-glucan comprises particles having an average particle size in at least one dimension of about 20 nm to about 200 μm.

3. The article of claim 1, wherein the surface area of the poly alpha-1,3-glucan is about 0.1 m$^2$/g to about 200 m$^2$/g as determined by the Brunauer-Emmett-Teller measurement method.

4. The article of claim 1, wherein the composite comprises about 1 weight percent to about 49 weight percent of the poly alpha-1,3-glucan.

5. The article of claim 1, wherein at least 90% of the glycosidic linkages of the poly alpha-1,3-glucan are alpha-1,3 glycosidic linkages.

6. The article of claim 1, wherein the composite further comprises inorganic particles selected from titanium dioxide, calcium carbonate, mica, vermiculite, silica, kaolin, talc, or a mixture thereof.

7. The article of claim 1, wherein the composite further comprises cationic starch, latex, a flocculating agent, or a retention agent.

8. The article of claim 1, wherein the poly alpha-1,3-glucan has at least 90% alpha-1,3 glycosidic linkages, less than 1% alpha-1,3,6-glycosidic branch points, and a number-average degree of polymerization of 55 to 10000.

9. The article of claim 1, wherein the article is paper.

10. A process for making a composite, the process comprising the steps of:
    (a) dispersing cellulose pulp and one or both of a polysaccharide or polysaccharide derivative in an aqueous medium to form a slurry;
    (b) filtering off the aqueous medium to form a wet composite; and
    (c) drying the wet composite to obtain a dry composite;
    wherein the polysaccharide comprises:
    (i) poly alpha-1,3-glucan, wherein at least 50% of the glycosidic linkages of the poly alpha-1,3-glucan are alpha-1,3 glycosidic linkages;
    (ii) poly alpha-1,3-glucan having at least 90% alpha-1,3 glycosidic linkages, less than 1% alpha-1,3,6-glycosidic branch points, and a number-average degree of polymerization of 55 to 10000; or
    (iii) water-insoluble cellulose having a weight-average degree of polymerization of about 10 to about 1000 and a cellulose II crystal structure;
    and wherein the polysaccharide derivative comprises:
    (i) a poly alpha-1,3-glucan ester compound represented by the structure:

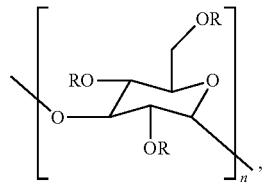

wherein
    (A) n is at least 6,
    (B) each R is independently an —H or a first group comprising —CO—C$_x$—COOH, wherein the —C$_x$— portion of said first group comprises a chain of 2 to 18 carbon atoms, and
    (C) the compound has a degree of substitution with the first group of about 0.001 to about 0.2;
    or
    (ii) a poly alpha-1,3-glucan ether compound represented by the structure:

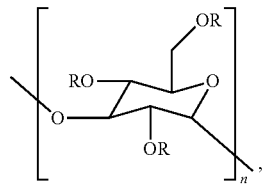

wherein
    (A) n is at least 6,
    (B) each R is independently an H or an organic group, and
    (C) the ether compound has a degree of substitution of about 0.001 to about 0.2.

11. The process of claim 10, further comprising a step of treating the wet composite obtained in step (b), or the dry composite obtained in step (c), with an aqueous NaOH or KOH solution.

12. The process of claim 10, wherein, in step (a), the cellulose pulp is dispersed into the aqueous medium with the polysaccharide comprising poly alpha-1,3-glucan, wherein at least 50% of the glycosidic linkages of the poly alpha-1,3-glucan are alpha-1,3 glycosidic linkages.

13. A composite comprising:
    (a) cellulose, and
    (b) a polysaccharide, a polysaccharide derivative, or a mixture thereof, wherein the polysaccharide and the polysaccharide derivative are water-insoluble;
    wherein the surface area of the polysaccharide or the polysaccharide derivative is about 0.1 m$^2$/g to about 200 m$^2$/g as determined by the Brunauer-Emmett-Teller measurement method, wherein the polysaccharide comprises a poly alpha-1,3-glucan, and wherein the polysaccharide derivative comprises a poly alpha-1,3-glucan ether or a poly alpha-1,3-glucan ester.

14. The composite of claim 13, wherein the composite comprises the polysaccharide, and the polysaccharide comprises poly alpha-1,3-glucan, wherein at least 50% of the glycosidic linkages of the poly alpha-1,3-glucan are alpha-1,3 glycosidic linkages.

15. The composite of claim 14, wherein at least 90% of the glycosidic linkages of the poly alpha-1,3-glucan are alpha-1,3 glycosidic linkages.

16. The composite of claim 14, wherein the composite comprises about 1 weight percent to about 49 weight percent of the poly alpha-1,3-glucan.

17. The composite of claim 13, wherein the composite comprises the polysaccharide derivative, and the polysaccharide derivative comprises a poly alpha-1,3-glucan ester compound represented by the structure:

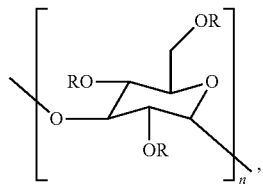

wherein
(A) n is at least 6;
(B) each R is independently an —H or a first group comprising —CO—$C_x$—COOH, wherein the —$C_x$— portion of said first group comprises a chain of 2 to 18 carbon atoms; and
(C) the compound has a degree of substitution with the first group of about 0.001 to about 0.2; and
wherein the composite comprises about 1 weight percent to about 99 weight percent of the poly alpha-1,3-glucan ester compound.

18. The composite of claim 13, wherein the composite comprises the polysaccharide derivative, and the polysaccharide derivative comprises a poly alpha-1,3-glucan ether compound represented by the structure:

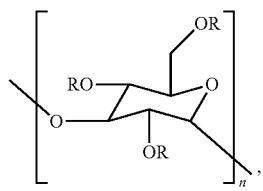

wherein
(A) n is at least 6,
(B) each R is independently an H or an organic group, and
(C) the ether compound has a degree of substitution of about 0.001 to about 0.2; and
wherein the composite comprises about 1 weight percent to about 99 weight percent of the poly alpha-1,3-glucan ether compound.

19. An article comprising the composite of claim 13.

20. The article of claim 19, wherein the article is a paper, packaging material, insulating material, paper cup, paper plate, or egg carton.

21. A composite comprising:
(a) cellulose, and
(b) a water-insoluble polysaccharide derivative;
wherein the polysaccharide derivative comprises a poly alpha-1,3-glucan ester compound represented by the structure:

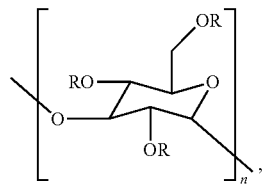

wherein
(A) n is at least 6;
(B) each R is independently an —H or a first group comprising —CO—$C_x$—COOH, wherein the —$C_x$— portion of said first group comprises a chain of 2 to 18 carbon atoms; and
(C) the compound has a degree of substitution with the first group of about 0.001 to about 0.2; and
wherein the composite comprises about 1 weight percent to about 99 weight percent of the poly alpha-1,3-glucan ester compound.

22. An article comprising the composite according to claim 21,
wherein the article is a paper, packaging material, insulating material, paper cup, paper plate, or egg carton.

23. An article comprising a composite, wherein the composite comprises:
(a) cellulose, and
(b) water-insoluble cellulose having (i) a weight-average degree of polymerization of about 10 to about 1000, and (ii) a cellulose II crystal structure,
wherein the composite comprises about 1 weight percent to about 99 weight percent of the water-insoluble cellulose;
wherein the article is a paper, packaging material, insulating material, paper cup, paper plate, or egg carton.

24. An article comprising a composite, wherein the composite comprises:
(a) cellulose, and
(b) a poly alpha-1,3-glucan ether compound represented by the structure:

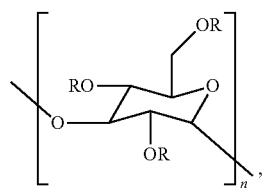

wherein
(A) n is at least 6,
(B) each R is independently an H or an organic group, and
(C) the ether compound has a degree of substitution of about 0.001 to about 0.2; and wherein the composite comprises about 1 weight percent to about 99 weight percent of the poly alpha-1,3-glucan ether compound;

wherein the article is a paper, packaging material, insulating material, paper cup, paper plate, or egg carton.

* * * * *